United States Patent
Lee

(10) Patent No.: US 8,023,901 B2
(45) Date of Patent: Sep. 20, 2011

(54) METHOD AND APPARATUS FOR DECIDING CHANNEL QUALITY INDICATOR IN WIRELESS COMMUNICATION SYSTEM

(75) Inventor: Young-Je Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 1090 days.

(21) Appl. No.: 11/828,055

(22) Filed: Jul. 25, 2007

(65) Prior Publication Data

US 2008/0026783 A1 Jan. 31, 2008

(30) Foreign Application Priority Data

Jul. 25, 2006 (KR) .................. 10-2006-0069654

(51) Int. Cl.
*H04B 17/00* (2006.01)
(52) U.S. Cl. .............. 455/67.13; 455/67.11; 455/68; 455/69; 455/561; 455/452.1; 455/452.2; 455/522; 370/252; 370/329; 370/332; 370/333
(58) Field of Classification Search .... 455/67.11–67.16, 455/68–69, 561, 226.1–226.3, 452.1–452.2, 455/450, 522; 370/252–253, 329, 341, 332, 370/333
See application file for complete search history.

(56) References Cited

U.S. PATENT DOCUMENTS

| 5,778,317 | A | 7/1998 | Kaminsky | |
|---|---|---|---|---|
| 7,124,350 | B2 | 10/2006 | Chao et al. | |
| 7,328,019 | B2 * | 2/2008 | Nishikawa et al. | 455/436 |
| 7,444,169 | B2 * | 10/2008 | Ishii et al. | 455/561 |
| 7,532,595 | B2 * | 5/2009 | Nibe | 370/329 |
| 2004/0184482 | A1 | 9/2004 | Gronberg et al. | |
| 2005/0003782 | A1 * | 1/2005 | Wintzell | 455/226.3 |
| 2005/0250540 | A1 * | 11/2005 | Ishii et al. | 455/561 |
| 2006/0079264 | A1 * | 4/2006 | Gu et al. | 455/522 |
| 2006/0093024 | A1 | 5/2006 | Pietraski et al. | |
| 2006/0211391 | A1 * | 9/2006 | Nishikawa et al. | 455/226.1 |
| 2007/0147289 | A1 * | 6/2007 | Nibe | 370/329 |

FOREIGN PATENT DOCUMENTS

KR 1020060047672 5/2006

* cited by examiner

*Primary Examiner* — Tuan A Tran
(74) *Attorney, Agent, or Firm* — The Farrell Law Firm, P.C.

(57) ABSTRACT

Provided are a method and an apparatus for deciding a channel quality indicator (CQI) in a wireless communication system. The method includes randomly generating CQI values encoded into genotypes to form an initial genetic group; evaluating fitnesses using the CQI values and a measured block error rate (BLER), and if the CQI value indicating the highest fitness is not within a range of the BLER, selecting a specific gene of genes of the initial genetic group to perform crossover and mutation operations; and repeating the crossover and mutation operations to allow a new genetic group generated by the crossover and mutation operations to be within the range of the BLER.

19 Claims, 5 Drawing Sheets

METHOD AND APPARATUS FOR DECIDING CHANNEL QUALITY INDICATOR IN WIRELESS COMMUNICATION SYSTEM

PRIORITY

This application claims priority under 35 U.S.C. §119 to an application filed in the Korean Intellectual Property Office on Jul. 25, 2006 and assigned Serial No. 2006-69654, the contents of which are incorporated herein by reference.

BACKGROUND OF THE INVENTION

1. Field of the Invention

The present invention relates generally to a method and an apparatus for deciding a Channel Quality Indicator (CQI) in a wireless communication system, and in particular, to a method and an apparatus for deciding a CQI using a genetic algorithm (GA) in a wireless communication system.

2. Description of the Related Art

High Speed Downlink Packet Access (HSDPA) technology is in an evolution progress of asynchronous International Mobile Telecommunications (IMT)-2000 standards. The HSDPA is an access scheme which defines a transport channel such as a High Speed-Downlink Shared CHannel (HS-DSCH), and control channels such as a High Speed-Shared Control CHannel (HS-SCCH) and a High Speed-Dedicated Physical Control CHannel (HS-DPCCH) in order to support a high-speed downlink packet data service. The definition is given to allow the transport channel and the control channels to operate in Frequency Division Duplexing (FDD) and Time Division Duplexing (TDD) of Release 5 of a Universal Mobile Telecommunications System (UMTS). The HSDPA is also a main feature of Release 5 standards of a $3^{rd}$ Generation Partnership Project (3GPP). In particular, HSDPA is recognized as a system which efficiently provides an information provider (IP) multimedia service which has dramatically improved a transfer rate and recently come into the spotlight.

A structure of a system using an HSDPA protocol is modified to position a scheduling function and most radio resource control functions in a Node B (base station) close to a wireless access interface so as to efficiently use link adaptation techniques such as Adaptive Modulation and Coding (AMC) or Hybrid Automatic Repeat reQuest (HARQ) adopted in HSDPA. For this purpose, a sub-layer called a Medium Access Control high speed (MAC-hs) layer is positioned at a lowest part of a MAC layer to function to select a Modulation and Coding Scheme (MCS) fit for fading channel environments or schedule data.

2 ms(=3 slots) corresponding to ⅕ of an existing 10 ms(=15 slots) frame is determined as a sub-frame and defined to be a size of a Transmission Time Interval (TTI) in order to effectively cope with momentary variations of a channel. Also, a User Equipment (UE) measures a received shared pilot channel and transmits a Channel Quality Indicator (CQI) reflecting the received shared pilot channel through an HS-DPCCH in order to assist the Node B to determine a state of the channel. The Node B transmits packet data to the UE in order to increase a throughput of the channel, wherein AMC using a modulation scheme and a channel coding rate varying with variations of the channel indicated by the CQI is applied to the packet data. The UE uses HARQ to transmit whether the packet data has been successfully received, as an acknowledgement (ACK) or a negative ACK (NACK) through the HS-DPCCH to the Node B. Here, a size of the transmitted packet data is determined according to the modulation scheme and the channel coding rate. Thus, a downlink data processing speed is determined according to a CQI value.

In the prior art as described above, a 3GPP spec recommends that a CQI value be set so that a block error rate (BLER) does not exceed 0.1 (10%). Thus, solution enterprises substantially realize CQIs using different methods, which are rarely recognized as unique schemes and open to the public. The methods are only to decide central values of CQI distributions as the CQIs with reference to BLERs depending on the CQI distributions. Here, since CQI values vary with ranges of determining the CQI distributions and measuring the BLERs, it is difficult to fully understand unique methods of deciding CQIs. The BLERs necessary for deciding the CQIs must be kept under 10% but are substantially difficult to satisfy this condition. This is because probability values using the central values of the CQI distributions, not individual values, are determined as the CQIs. Also, when data is coded using a turbo decoder, the BLERs suddenly change. Thus, the BLERs are determined within a range between 25% and 30%.

Accordingly, a method and an apparatus for ensuring a BLER of less than 10% and rapidly deciding a CQI as an individual value are required.

SUMMARY OF THE INVENTION

An aspect of the present invention is to substantially solve at least the above problems and/or disadvantages and to provide at least the advantages below. Accordingly, an aspect of the present invention is to provide a method and an apparatus for deciding a Channel Quality Indicator (CQI) fit for wireless environments using a genetic algorithm (GA).

Another aspect of the present invention is to provide a method and an apparatus for selecting a CQI satisfying a condition of a block error rate (BLER).

A further aspect of the present invention is to provide a method and an apparatus for obtaining a CQI as an individual value.

According to one aspect of the present invention, there is provided a method of deciding a CQI using a GA in a mobile communication terminal, including randomly generating CQI values encoded into genotypes to form an initial genetic group; evaluating fitnesses using the CQI values and a measured block error rate (BLER), and if the CQI value indicating the highest fitness is not within a range of the BLER, selecting a specific gene of genes of the initial genetic group to perform crossover and mutation operations; and repeating the crossover and mutation operations to allow a new genetic group generated by the crossover and mutation operations to be within the range of the BLER.

According to another aspect of the present invention, there is provided a method of reporting a CQI in a mobile communication terminal, including observing a corresponding wireless channel to measure a BLER; deciding a CQI value indicating highest fitness using a GA calculating fitnesses using the BLER and a CQI value; and encoding the decided CQI value and transmitting the encoded CQI value to a base station.

According to a further aspect of the present invention, there is provided a method of transmitting data using a CQI in a base station, including receiving an encoded CQI value from a mobile communication terminal deciding a CQI value using a GA and decoding the encoded CQI value; and transmitting data to the mobile communication terminal in consideration of a modulation scheme and a channel encoding rate corresponding to the decoded CQI value.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention provides a method and an apparatus for deciding a Channel Quality Indicator (CQI) using a genetic algorithm (GA).

Figure 1:
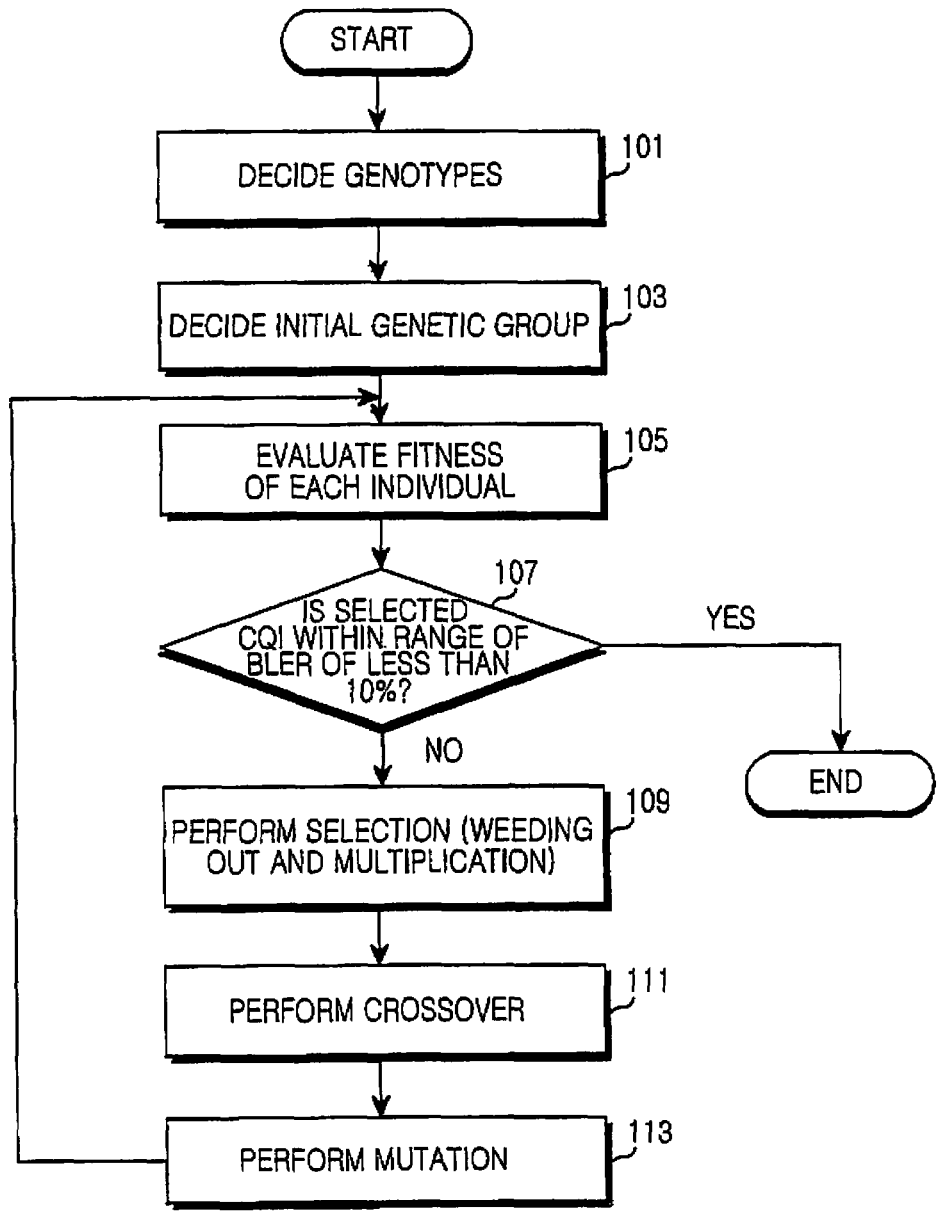
FIG. 1 is a flowchart of a method of deciding a Channel Quality Indicator (CQI) using a genetic algorithm (GA) according to the present invention.

FIG. 1 is a flowchart of a method of deciding a CQI using a GA according to the present invention. The GA ergonomically models mechanisms of genetics and evolution of living things in the natural world to deal with adaptive abilities of the living things to environments. The GA is also an optimal method based on a natural selection principle which was first introduced in the book "Adaptation on Natural and Artificial Systems" by John Holland in 1975. The GA is mainly used as a tool for searches, optimizations, and mechanical learning.

In more detail, the GA expresses possible solutions to problems to be solved in predetermined data formats and then gradually transforms the possible solutions in order to generate better solutions. In other words, the GA expresses the possible solutions as chromosomes and then gradually transforms the chromosomes in order to generate better solutions. Each of the possible solutions is regarded as an organism or an individual, and a set of the organisms or individuals is a population. An individual normally includes one or several chromosomes, and operators transforming the one or several chromosomes are called genetic operators. There are three types of basic operators. The first one is a selection operator which determines a survival distribution of an individual of a group, wherein the individual performs a crossover according to a distribution of fitness in the following steps. Since the selection operator is based on the distribution of fitness, an individual indicating higher fitness generates many descendants. A second type is a crossover operator which interchanges genes of two chromosomes to generate a new individual. A third type is a mutation operator which forcibly changes a value of a part of a gene.

Referring to FIG. 1, if a CQI value is required to be changed due to a variation of a BLER resulting from variations of radio conditions, the GA starts. Alternatively, if current fitness of a CQI is less than or greater than previous fitness of the CQI, the GA may start. In step 101, a possible solution to a problem to be solved is encoded into chromosome types (genotypes). Here, the possible solution is a CQI value which is encoded into the chromosome types (genotypes), i.e., into binary vector information having a 5-bit length.

Referring to Table 1 below, a CQI value may be within a range between 1 and 30 and encoded into binary vectors, i.e., into 5 bits. For example, the CQI values "1", "2", . . . , "16", . . . , and "30" are encoded into "00001", "00010", . . . , "10000", and "11110", respectively.

CQI values applied to HSDPA categories 1 through 6 are shown in Table 1 below.

TABLE 1

| CQI Value | TB Size | No. of HS-PDSCH | Mod. Scheme | Ref. Power Adjustment (Delta) |
|---|---|---|---|---|
| 0 | N/A | | | |
| 1 | 137 | 1 | QPSK | 0 |
| 2 | 173 | 1 | QPSK | 0 |
| 3 | 233 | 1 | QPSK | 0 |
| 4 | 317 | 1 | QPSK | 0 |
| 5 | 377 | 1 | QPSK | 0 |
| 6 | 461 | 1 | QPSK | 0 |
| 7 | 650 | 2 | QPSK | 0 |
| 8 | 792 | 2 | QPSK | 0 |
| 9 | 931 | 2 | QPSK | 0 |
| 10 | 1262 | 3 | QPSK | 0 |
| 11 | 1483 | 3 | QPSK | 0 |
| 12 | 1742 | 3 | QPSK | 0 |
| 13 | 2279 | 4 | QPSK | 0 |
| 14 | 2583 | 4 | QPSK | 0 |
| 15 | 3319 | 5 | QPSK | 0 |
| 16 | 3565 | 5 | 16-QAM | 0 |
| 17 | 4189 | 5 | 16-QAM | 0 |
| 18 | 4664 | 5 | 16-QAM | 0 |
| 19 | 5287 | 5 | 16-QAM | 0 |
| 20 | 5887 | 5 | 16-QAM | 0 |
| 21 | 6554 | 5 | 16-QAM | 0 |
| 22 | 7168 | 5 | 16-QAM | 0 |
| 23 | 7168 | 5 | 16-QAM | −1 |
| 24 | 7168 | 5 | 16-QAM | −2 |
| 25 | 7168 | 5 | 16-QAM | −3 |
| 26 | 7168 | 5 | 16-QAM | −4 |
| 27 | 7168 | 5 | 16-QAM | −5 |
| 28 | 7168 | 5 | 16-QAM | −6 |
| 29 | 7168 | 5 | 16-QAM | −7 |
| 30 | 7168 | 5 | 16-QAM | −8 |

As shown in Table 1 above, a size of a transport block (TB) which can be transported, a number of HS-PDSCHs, and a modulation scheme are determined according to the CQI value. In other words, a large amount of data is transported with an increase of the CQI value.

In step 103, an initial genetic group is generated. If the initial genetic group includes a large number of individuals, an operation time is increased. If the initial genetic group includes a smaller number of individuals, a search time is increased. Thus, the number of individuals belonging to the initial genetic group, i.e., predetermined CQI values, must be appropriately set. Here, the number of individuals of the initial genetic group is set to "10" in consideration of a time required for searching for a CQI.

Here, 10 individuals, i.e., "v[1]: (01101)", "v[2]: (01111)", "v[3]: (10100)", "v[4]: (01101)", "v[5]: (10101)", "v[6]: (01011)", "v[7]: (10111)", "v[8]: (10000)", "v[9]: (01101)" and "v[10]: (01011)" are randomly generated, wherein v[x] denotes a random CQI value of a $x^{th}$ individual.

For reference, the initial genetic group is randomly determined. However, if the GA is performed several times or more due to the variation of the BLER caused by variations of the radio conditions, a genetic group is decided based on a previously set CQI.

In step 105, fitness of each of the individuals of the initial genetic group is evaluated.

The fitness evaluation depends on a fitness function for measuring how much each chromosome affects a solution to a problem. In other words, the fitness function is used to evaluate a CQI value of CQI values of a genetic group fittest for current radio conditions and selects a CQI value indicating higher fitness.

For example, if the fitness of the initial genetic group has a largest value of 10 values as shown below, X value "21" is determined as a CQI value.

eval(v[1])=f(13)=13, eval(v[2])=f(15)=15, eval(v[3])=f(20)=18.0, eval(v[4])=f(13)=13, eval(v[5])=f(21)=18.9, eval(v[6])=f(11)=11, eval(v[7])=f(24)=17.2, eval(v[8])=f(16)=16.3, eval(v[9])=f(13)=13, eval(v[10])=f(11)=11.

The fitness function $f(x)$ is defined as in Equation (1)

$$f(X)=X*(1-BLER) \quad (1)$$

wherein X denotes a CQI value which is an integer between "1" and "30", and BLER denotes a block error rate having a real value between "0" and "10.0", where if the BLER is 10%, the real value is "1.0" but if 100%, "10.0".

A BLER and a TB size are factors for deciding a CQI value. The BLER must be within a range of 10%, and the TB size must be within the range of the BLER. If the TB size is increased within the range of the BLER, a data speed may then be increased.

The BLER must not exceed 10% as previously mentioned. Thus, if the BLER exceeds 10%, the BLER may have a minus value through the fitness function. Therefore, the BLER must have a positive value to be an effective value. If a CQI value selected at the BLER of 2% is greater than a CQI value selected at the BLER of "0%", data transmitted during a selection of a CQI value at the BLER of "0%" may become small and thus inefficient. As a result, although the BLER is within a predetermined range, a relatively greater CQI value should be selected to increase a size of transmitted data. Accordingly, the BLER is multiplied by a CQI as in Equation (1) above to consider a predetermined margin of the BLER.

In step 107, a determination is made as to whether the selected CQI value (X=21) is within the range of the BLER of 10%. If it is determined in step 107 that the selected CQI value (X=21) is not within the range of the BLER of 10%, the method proceeds to step 109 to select (weed out and multiply) a specific gene (CQI) among the genetic group.

The selection performed in step 109 is a process of selecting individuals according to the fitness and generating a next generation. The selection method may be one of three types: a proportionate selection method of selecting an individual according to a probability proportionate to a value of fitness; a ranking selection method of selecting an individual according to a fitness-based ranking; and a tournament method of selecting an individual indicating higher fitness. The detailed contents of the selection are described in the book "Adaptation on Natural and Artificial Systems" by John Holland.

In step 111, a crossover is performed using the individual selected in step 109. If only a selection operator is used, the GA may generate only the individuals belonging to the initial genetic group but may not generate a new individual. Thus, a crossover operator is used to search for individuals having different structures.

If there are chromosomes x=(x1, x2, x3, x4, x5) and y=(y1, y2, y3, y4, y5), the crossover operator generates a random number between 1 and 5. If the random number "3" is generated, chromosomes after a third chromosome of the chromosome x, i.e., fourth and fifth chromosomes, are exchanged with chromosomes after a third chromosome of the chromosome y, i.e., fourth and fifth chromosomes.

After the crossover, the chromosome x=(x1, x2, x3, x4, x5) is changed into x'=(x1, x2, x3, y4, y5), and the chromosome y=(y1, y2, y3, y4, y5) is changed into y'=(y1, y2, y3, x4, x5) to generate a new gene.

For example, if individuals "v[2]: (01111)" and "v[9]: (01101)" are selected using the proportionate selection method in step 107 and thus "v[2]" and "v[9]" are crossed over with each other, the following result is obtained.

If the crossover random number "1" is generated, "v[2]: (0 1111)" and "v[9]: (0 1101)" are crossed over to "v'[2]: (0 1101)" and "v'[9]: (0 1111)", respectively.

In step 113, a mutation is performed. In a case of a binary GA using a binary string as a chromosome, the mutation operator changes each bit, i.e., "0" into "1" or "1" into "0", according to a mutation probability. To perform the mutation, a mutation of each bit of the binary string is independently applied as a probability P.

A mutation operator plays an important role in maintaining diversity of a population. If $i^{th}$ genes of chromosomes of the population all have only the same value, new genetic traits may not be given to positions of the $i^{th}$ genes through only crossovers of the chromosomes. However, the mutation operator enables new genetic traits to be given to the positions of the $i^{th}$ genes.

For example, if a third bit of only a ninth gene "v'[9]: (01111)" of the initial genetic group is mutated according to the mutation probability after step 111 is performed, the ninth gene "v'[9]:(0 1111)" is mutated into "v"[9]: (01011)".

After mutation in Step 113, the method returns to step 105 to repeat steps 107, 109, 111, and 113 until the fitness of each of the individuals of the initial genetic group satisfies evaluation standards.

If the selected CQI value is within the range of the BLER of less than 10% in step 107, the GA ends.

Figure 2:
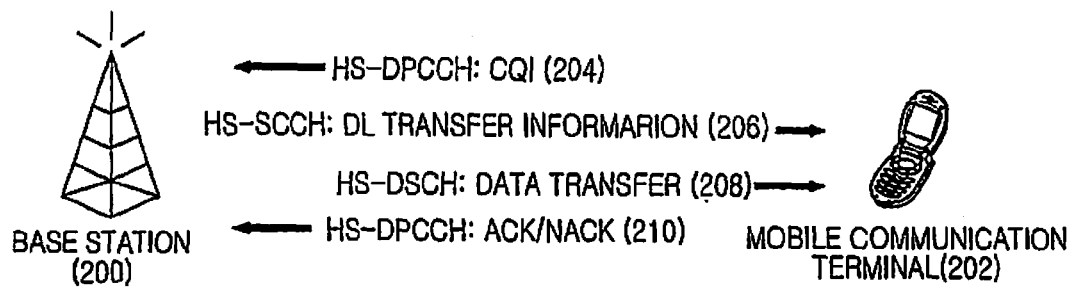
FIG. 2 illustrates an operation of a High Speed Downlink Packet Access (HSDPA) channel according to the present invention.

FIG. 2 illustrates an operation of a High Speed Downlink Packet Access (HSDPA) channel according to the present invention.

Referring to FIG. 2, a mobile communication terminal 202 monitors a High Speed Shared Control CHannel (HS-SCCH) 206 to receive packet data from a base station 200 through a High Speed Downlink Shared CHannel (HS-DSCH) 208. The HS-SCCH 206 is a downlink channel used by the base station 200 to transmit control information the mobile communication terminal 202 requires to receive the packet data through the HS-DSCH 208 and control information necessary for other purposes.

The mobile communication terminal 202 senses the HS-SCCH 206 to start receiving the packet data through the HS-DSCH 208. After the mobile communication terminal 202 receives the packet data, the mobile communication terminal 202 feeds back an ACK and/or NACK 210 and a CQI 204 through a High Speed Dedicated Physical Control CHannel (HS-DPCCH), wherein the CQI 204 indicates modulation and coding information fit for conditions of a corresponding channel.

Figure 3:
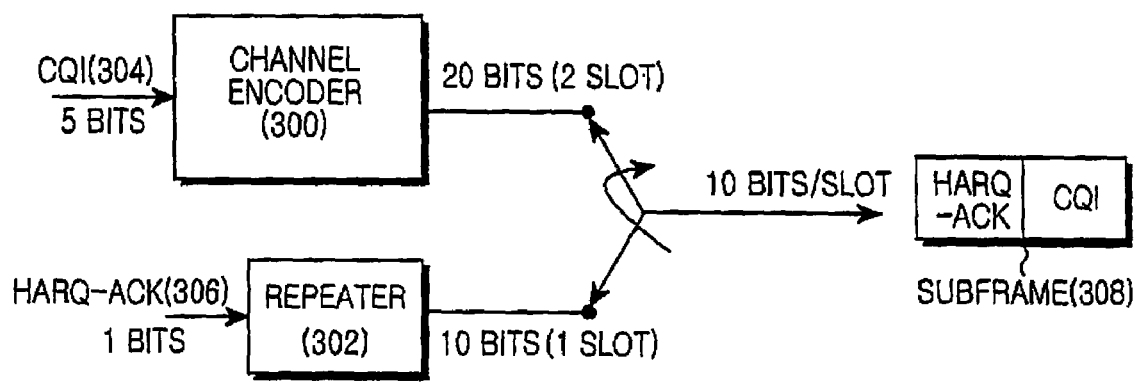
FIG. 3 illustrates a block diagram of a sub-frame of a High Speed-Dedicated Physical Control Channel (HS-DPCCH) according to the present invention.

FIG. 3 illustrates a structure of a sub-frame of an HS-DPCCH according to the present invention.

Referring to FIG. 3, forward link signaling information is necessary for assisting a transfer of downlink packet data and includes a Hybrid ARQ Acknowledgement (HARQ-ACK) 306 and a CQI 304. The HARQ-ACK 306 is 1-bit information for informing a mobile communication terminal of whether the mobile communication terminal has successfully received the downlink packet data through an HS-DSCH. The CQI 304 is 5-bit information used to feed back downlink parameters mapped into a downlink channel quality measured by the mobile communication terminal.

The CQI 304 uses codes "(20, 5)", and the HARQ-ACK 306 uses repetition codes "(10, 1)". In other words, the CQI 304 is encoded into 20 bits through a channel encoder 300 and then filled into 2 slots of a sub-frame 308 of the HS-DPCCH. The HARQ-ACK 306 is encoded into 10 bits through a repeater 302 and then filled into 1 slot of the sub-frame 308 of the HS-DPCCH so as to form the sub-frame (2 msec) 308 along with 20 bits of the CQI 304.

Figure 4:
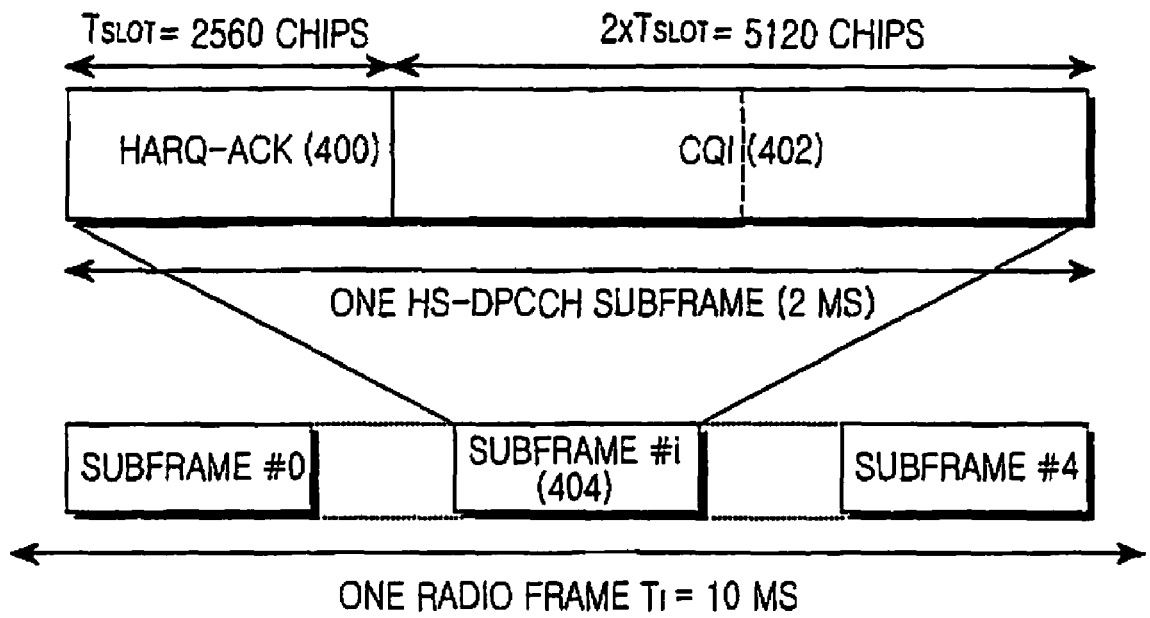
FIG. 4 illustrates a frame structure of an HS-DPCCH according to the present invention.

FIG. 4 illustrates a frame structure of an HS-DPCCH according to the present invention, Referring to FIG. 4, each radio frame having a length of 10 ms includes five sub-frames 404 each having 7680 chips and a length of 2 ms. Each of the sub-frames 404 includes three slots each having 2560 chips. As shown in FIG. 4, a HARQ-ACK 400 is transported to a first slot of an HS-DPCCH sub-frame, and a CQI 402 is transported to second and third slots of the HS-DPCCH sub-frame. Only one HS-DPCCH may be positioned between a base station and each HSDPA terminal, and the HS-DPCCH must be necessarily used along with a forward link DPCCH.

Figure 5:
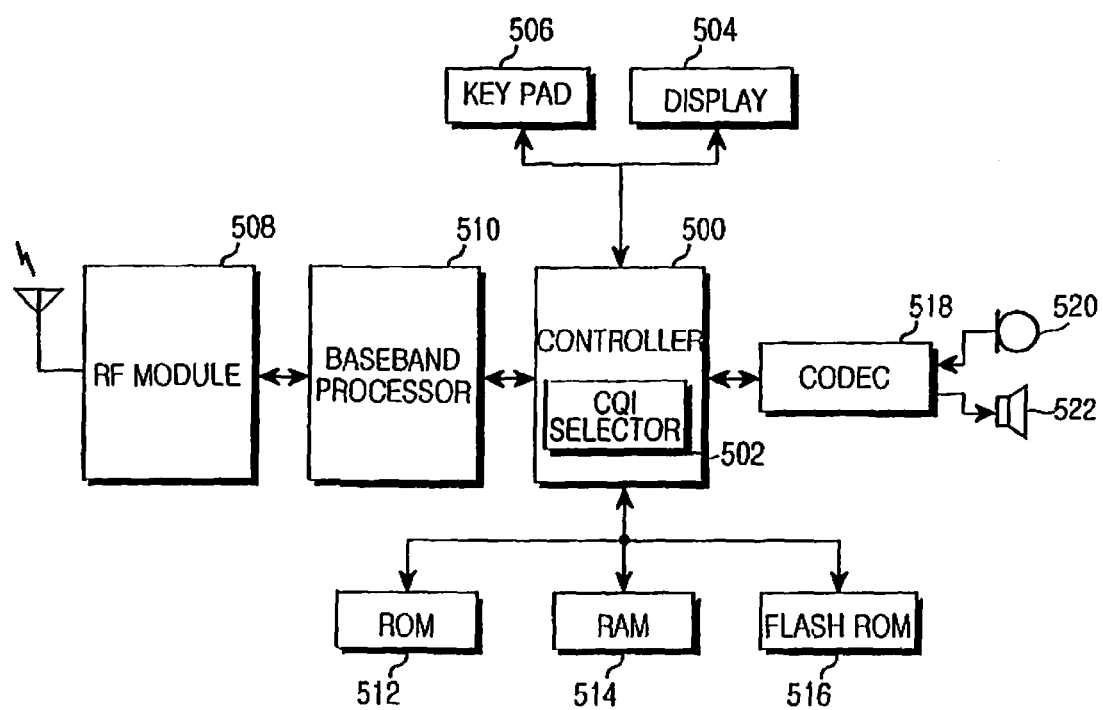
FIG. 5 is a block diagram of an apparatus for deciding a CQI using a GA according to the present invention.

FIG. 5 is a block diagram of an apparatus for deciding a CQI value using a GA according to the present invention.

Referring to FIG. 5, a controller 500 controls an overall operation of a mobile communication terminal. For example, the controller 500 performs normal processing and controlling functions for voice calls and data communications. The controller 500 includes a CQI selector 502 to perform processing and controlling functions for deciding an optimal CQI value using a GA, besides the normal processing and controlling functions. The descriptions of the normal processing and controlling functions of the controller 500 will be omitted herein.

A read only memory (ROM) 512 stores micro-codes and various types of reference data of a program for the processing and controlling functions of the controller 500. In particular, according to the present invention, the ROM 512 stores an automatic response program set by a user in addition to the normal function for storing the micro-codes and various types of reference data.

A random access memory (RAM) 514 is a working memory of the controller 500 and stores temporary data generated during executions of various programs.

A flash ROM 516 stores various storage data which can be updated such as a phone book, a transmitted message, and a received message. In particular, according to the present invention, the flash ROM 516 stores a user set value for an automatic response in addition to the normal function of storing the various storage data.

A key pad 506 includes a plurality of function keys such as numerical keys from "0" to "9", a menu key, a cancel (delete) key, a confirmation key, a talk key, an end key, an Internet access key, a navigation key (or direction key), etc. The keypad 506 provides key input data corresponding to a key pressed by a user to the controller 500.

A display 504 displays state information, limited numerical letters, a large number of moving pictures, a large number of still pictures, etc. generated during an operation of the mobile communication terminal. The display 504 may be a color liquid crystal display (LCD).

A coder-decoder (CODEC) 518 connected to the controller 500 and a speaker 522 and a microphone 520 connected to the CODEC 518 are voice input and output blocks used to record telephone calls and voice.

The CODEC 518 converts Pulse Code Modulation (PCM) data provided from the controller 500 into an analog sound signal and transmits the analog sound signal through the speaker 522. The CODEC 518 also converts a sound signal received through the microphone 520 into PCM data and provides the PCM data to the controller 500.

A radio frequency (RF) module 508 downconverts an RF signal received through an antenna and provides the downconverted RF signal to a baseband processor 510. The RF module 508 also upconverts a baseband signal output from the baseband processor 510 and transmits the upconverted baseband signal through the antenna.

The baseband processor 510 processes the baseband signals transmitted and received between the RF module 508 and the controller 500. For example, the baseband processor 510 performs channel coding and spreading on data to be transmitted, and despreading and channel decoding on a received signal.

As described above, in a method and an apparatus for deciding a CQI in a wireless communication system according to the present invention, a CQI can be selected using a GA. Thus, a CQI satisfying a condition that a BLER must be under 10% can be fast searched. Also, even if the CQI is changed due to variations of radio channel environments, a CQI fit for the radio channel environments, which has been mutated by an evolution occurring through a genetic operation, can be searched.

Alternate embodiments of the present invention can also comprise computer readable codes on a computer readable medium. The computer readable medium includes any data storage device that can store data that can be read by a computer system. Examples of a computer readable medium include magnetic storage media (such as ROM, floppy disks, and hard disks, among others), optical recording media (such as CD-ROMs or DVDs), and storage mechanisms such as carrier waves (such as transmission through the Internet). The computer readable medium can also be distributed over network coupled computer systems so that the computer readable code is stored and executed in a distributed fashion. Also, functional programs, codes, and code segments for accomplishing the present invention can be construed by programmers of ordinary skill in the art to which the present invention pertains.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of deciding a Channel Quality Indicator (CQI) using a genetic algorithm (GA) in a mobile communication terminal, comprising:
   randomly generating CQI values encoded into genotypes to form an initial genetic group;
   evaluating fitnesses using the CQI values and a measured block error rate (BLER), and if the CQI value indicating the highest fitness is not within a range of the BLER, selecting a specific gene of genes of the initial genetic group to perform crossover and mutation operations; and
   repeating the crossover and mutation operations to allow a new genetic group generated by the crossover and mutation operations to be within the range of the BLER.

2. The method of claim 1, wherein the fitness is calculated according to:

$$f(X)=X^*(1-BLER)$$

wherein $f(X)$ denotes a fitness function of the GA for calculating the fitness, X denotes a CQI value which is a constant between "1" and "30", and BLER denotes a data block error rate.

3. The method of claim 1, wherein the CQI value is selected so as to have a maximum data block size within the range of the BLER.

4. The method of claim 1, wherein the selection of the specific gene is performed using one of a proportionate selection method of selecting an individual according to a probability proportionate to a value of fitness, a ranking selection method of selecting an individual according to a fitness-based ranking, and a tournament selection method of selecting an individual indicating higher fitness among randomly selected individuals.

5. The method of claim 1, wherein if the CQI value is to be re-decided due to a variation of the BLER after the CQI value is decided, previously decided CQI values constitute the initial genetic group.

6. The method of claim 5, wherein the size of the re-initial genetic group is fewer than the size of the initial genetic group.

7. The method of claim 1, wherein the more the CQI value is large, the more a data block is large.

8. The method of claim 1, further comprising:
encoding the generated CQI values and transmitting the encoded CQI values to a base station.

9. The method of claim 8, further comprising:
receiving data from the base station which are transmitted to the mobile communication terminal in consideration of a modulation scheme and a channel encoding rate corresponding to a decoded CQI value at the base station.

10. An apparatus for deciding a Channel Quality Indicator (CQI) using a genetic algorithm (GA) in a mobile communication terminal, comprising:
a CQI selector for randomly generating CQI values encoded into genotypes to form an initial genetic group measuring fitnesses using the CQI values and a measured block error rate (BLER) if the CQI value indicating the highest fitness is not within a range of the measured BLER, selecting a specific gene of genes of the initial genetic group to perform crossover and mutation operations, and repeating the crossover and mutation operations to allow a new genetic group generated by the crossover and mutation operations to be within the range of the measured BLER so as to search for the CQI values.

11. The apparatus of claim 10, wherein the fitness is calculated according to:

$$f(X)=X^*(1-BLER)$$

wherein $f(X)$ denotes a fitness function of the GA for calculating the fitness, X denotes a CQI value which is a constant between "1" and "30", and BLER denotes a data block error rate.

12. The apparatus of claim 10, wherein the CQI value is selected so as to have a maximum data block size within the range of the measured BLER.

13. The apparatus of claim 10, wherein the selection of the specific gene is performed using one of a proportionate selection method of selecting an individual according to a probability proportionate to a value of fitness, a ranking selection method of selecting an individual according to a fitness-based ranking, and a tournament selection method of selecting an individual indicating higher fitness among randomly selected individuals.

14. The apparatus of claim 10, wherein if the CQI value is to be re-decided due to a variation of the measured BLER after the CQI value is decided, previously decided CQI values constitute the initial genetic group.

15. The apparatus of claim 14, wherein the size of the re-initial genetic group is fewer than the size of the initial genetic group.

16. The apparatus of claim 10, wherein the more the CQI value is large, the more a data block is large.

17. The apparatus of claim 10, further comprising:
a transmitter encoding the generated CQI values and transmitting the encoded CQI values to a base station.

18. The apparatus of claim 17, further comprising:
a receiver for receiving data from the base station which are transmitted to the mobile communication terminal in consideration of a modulation scheme and a channel encoding rate corresponding to a decoded CQI value at the base station.

19. A non-transitory computer-readable recording medium having recorded thereon a program for a Channel Quality Indicator (CQI) using a genetic algorithm (GA) in a mobile communication terminal, comprising:
a first code segment, for generating CQI values encoded into genotypes to form an initial genetic group; and
a second code segment, for evaluating fitnesses using the CQI values and a measured block error rate (BLER), and if the CQI value indicating the highest fitness is not within a range of the BLER, selecting a specific gene of genes of the initial genetic group to perform crossover and mutation operations; and
a third code segment, for repeating the crossover and mutation operations to allow a new genetic group generated by the crossover and mutation operations to be within the range of the BLER.

* * * * *